May 11, 1954

J. J. SURAN 2,678,373

METHOD AND APPARATUS FOR ELECTRICALLY PERFORATING
DIELECTRIC SHEET MATERIALS

Filed Feb. 10, 1951

INVENTOR.
Jerome J. Suran
BY
Burgess, Ryan & Hicks
ATTORNEYS

May 11, 1954  J. J. SURAN  2,678,373
METHOD AND APPARATUS FOR ELECTRICALLY PERFORATING
DIELECTRIC SHEET MATERIALS
Filed Feb. 10, 1951  6 Sheets-Sheet 2
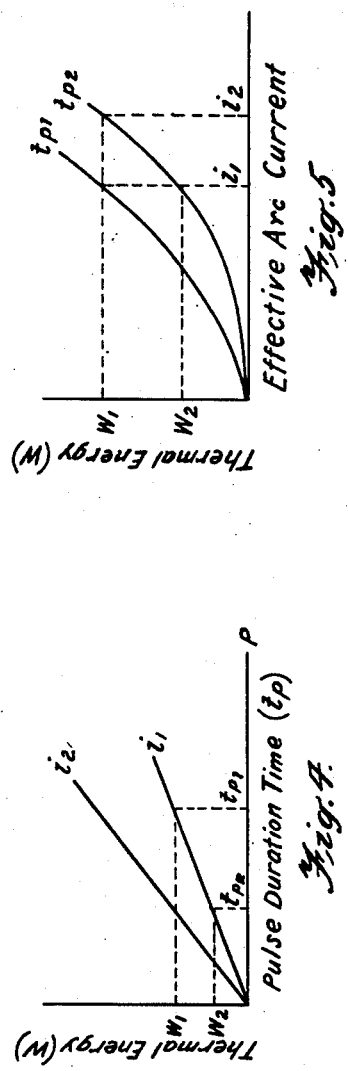
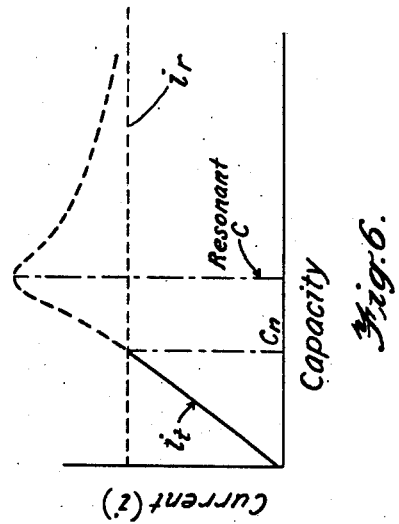
INVENTOR.
Jerome J. Suran
BY
Burgess, Ryan & Hicks
ATTORNEYS

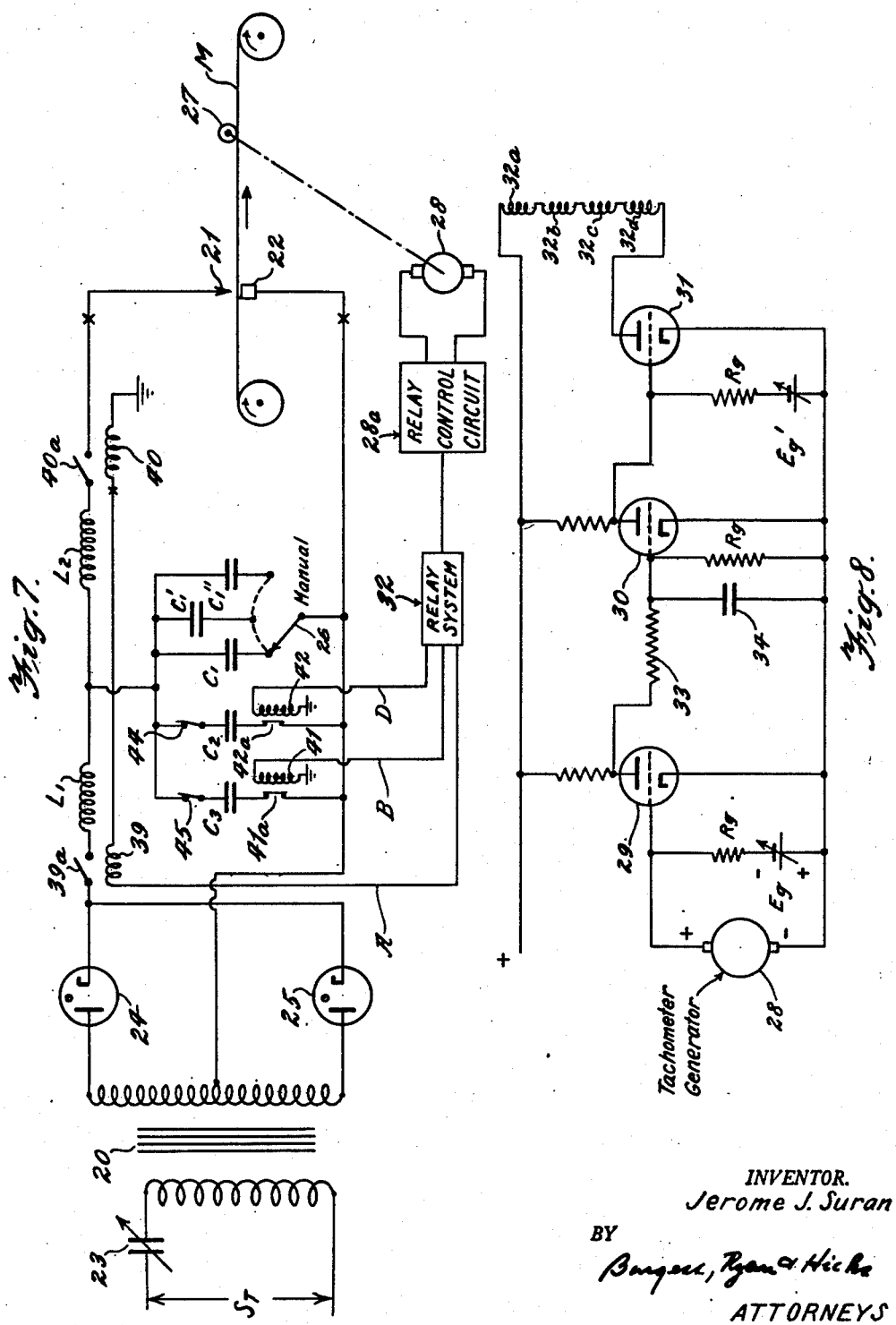

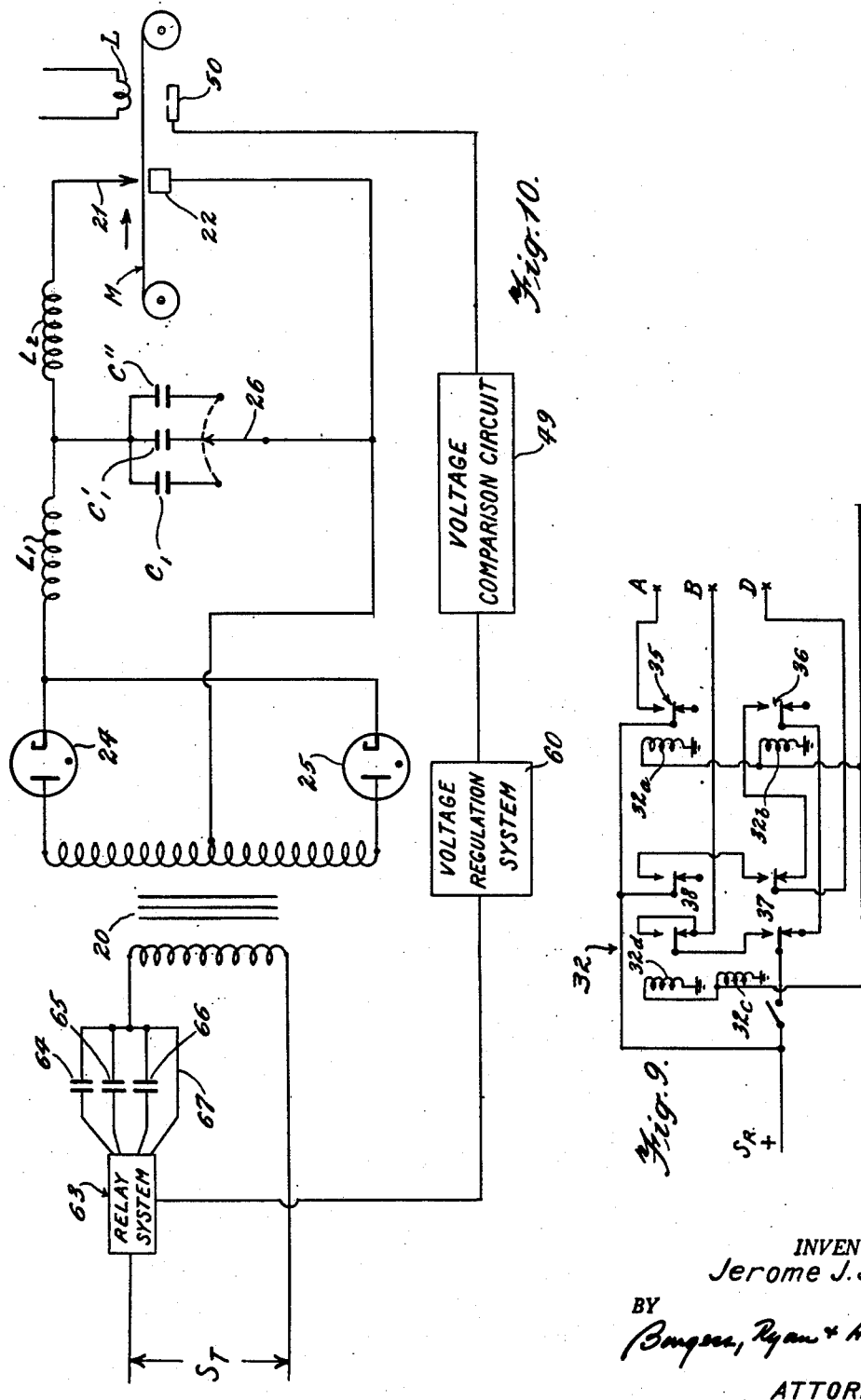

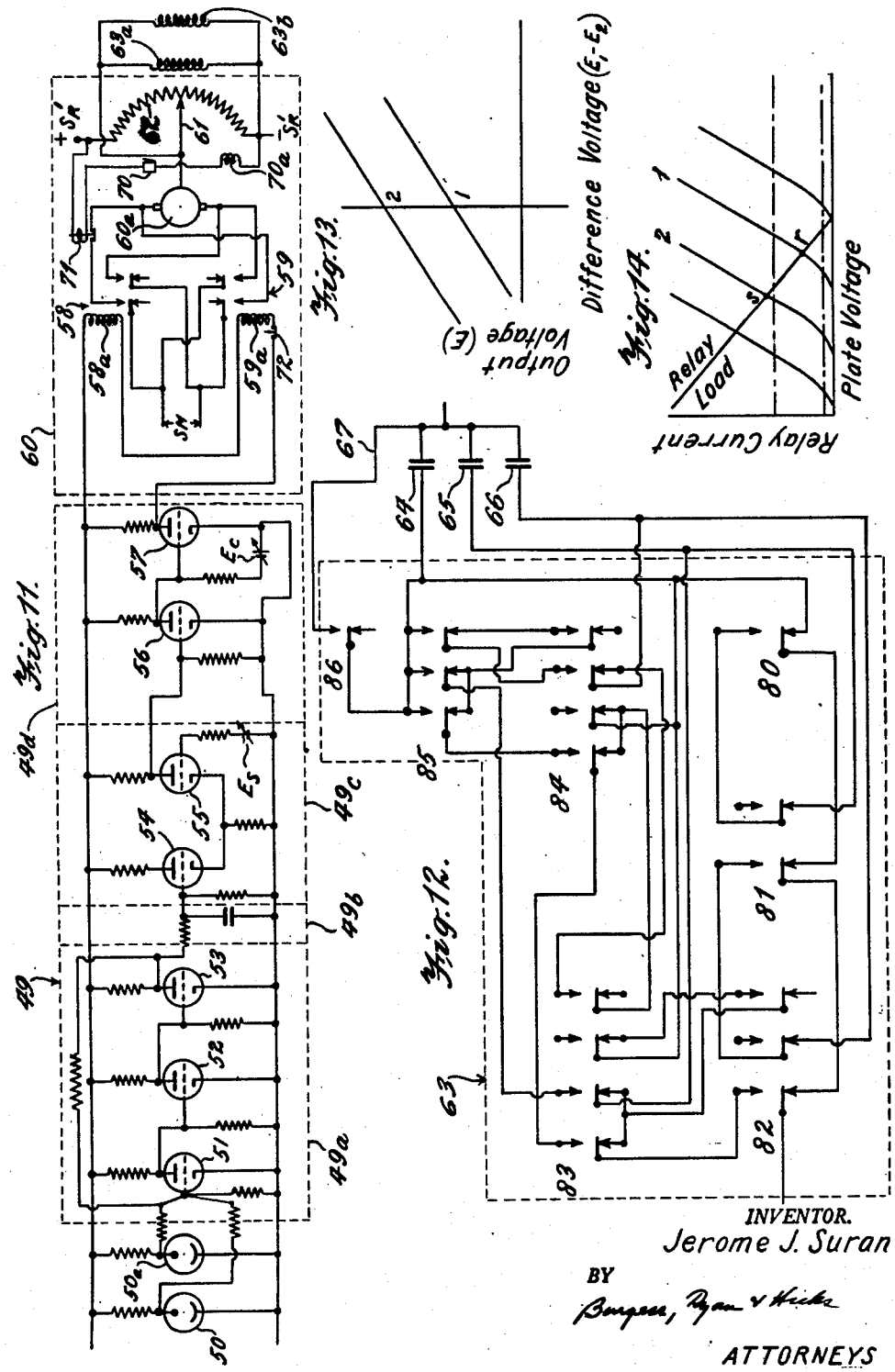

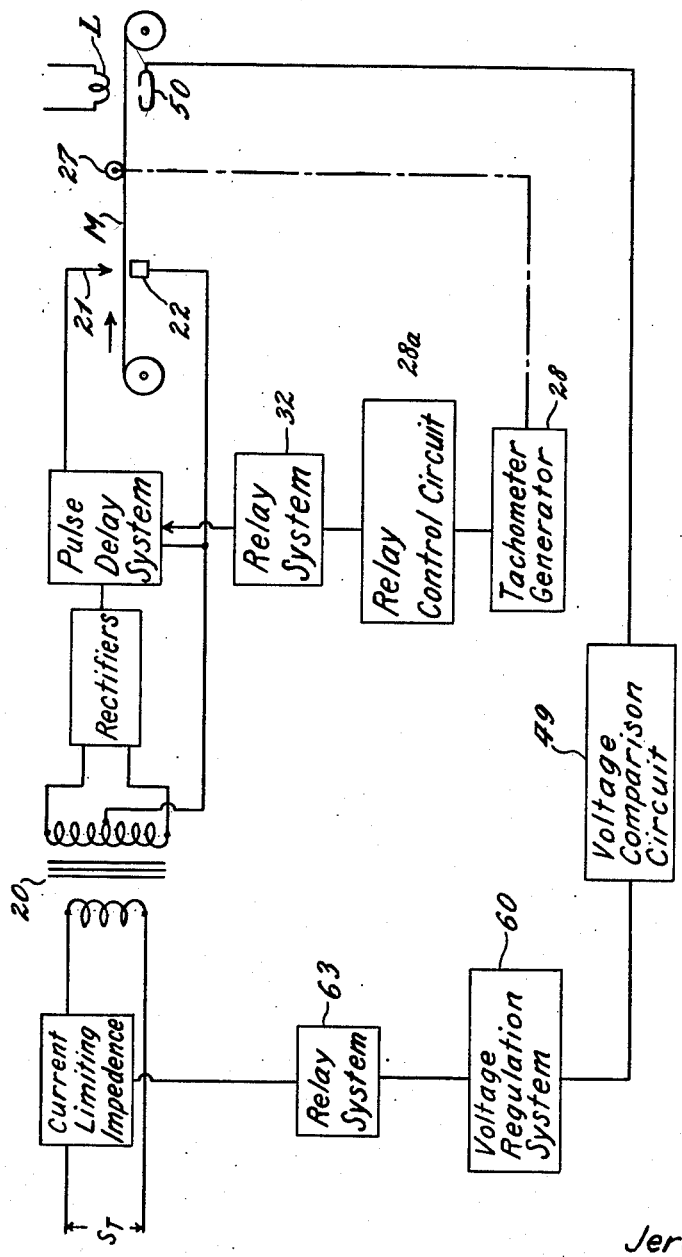

Patented May 11, 1954

2,678,373

UNITED STATES PATENT OFFICE 2,678,373

METHOD AND APPARATUS FOR ELECTRICALLY PERFORATING DIELECTRIC SHEET MATERIALS

Jerome J. Suran, Long Island City, N. Y., assignor to John W. Meaker, New York, N. Y.

Application February 10, 1951, Serial No. 210,401

26 Claims. (Cl. 219—19)

The present invention relates to improvements in method and apparatus for perforating sheet materials by means of electric arc discharges and relates, more particularly, to a method and apparatus in which the number of perforations per unit of area and the size of such perforations may be controlled as desired in the perforation of a moving web of dielectric sheet material by means of electric arc discharges.

An object of the present invention is to provide a method and apparatus for perforating dielectric sheet materials by means of electric arc discharges which employs a transformer that may be connected to the standard sources of alternating current and which provides for regulation of the frequency of the discharges as desired. Another object of the present invention is to provide a method and apparatus for controlling the size or area of the individual perforations as desired.

A further object of the invention is to provide automatic controls for maintaining a desired distribution of the perforations and/or the size or area of the individual perforations to obtain a desired porosity in the sheet material being perforated irrespective of changes in the dielectric properties of the sheet material or changes in the speed of operation. Further objects of the present invention are to provide adjustable safety elements which function in conjunction with the automatic control systems to preclude the possibility of fire, and to provide an alarm system which gives a visible or audible indication if the desired porosity in the perforated sheet material is not obtained when the apparatus is operating at its maximum capacity.

Various other objects and advantages of the present invention will be apparent from the following description and the accompanying drawings in which:

Fig. 4 is a graphical illustration in which the thermal energy of the electric arc discharge is represented as a function of the duration of the discharge;

Fig. 5 is a graphical illustration in which the thermal energy of the electric arc discharge is represented as a function of the effective discharge current;

Fig. 6 is a graphical illustration in which the current flowing in the discharge circuit is represented as a function of the current-limiting impedance in the circuit;

Fig. 7 is a schematic diagram illustrating a circuit embodying the invention with means for automatically controlling the perforation spacing;

Fig. 8 is a schematic wiring diagram of a portion of the circuit illustrated in Fig. 7;

Fig. 9 is a schematic wiring diagram of another portion of the circuit illustrated in Fig. 7;

Fig. 10 is a schematic diagram illustrating a circuit embodying the invention with means for automatically controlling the size or area of the individual perforations;

Fig. 11 is a schematic wiring diagram of a portion of the circuit illustrated in Fig. 10;

Fig. 12 is a schematic wiring diagram of another portion of the circuit illustrated in Fig. 10;

Fig. 13 is a graphical illustration showing the relation between the measured voltage generated by the circuit shown in Fig. 11 and the standard voltage for the desired porosity;

Fig. 14 is a graphical illustration representing the voltage-current operating characteristic of the relay control element of the circuit shown in Fig. 11; and Fig. 15 is a block diagram illustrating a discharge circuit embodying the invention with means for automatically controlling both the spacing of the perforations and the size or area of the individual perforations.

Figure 1:
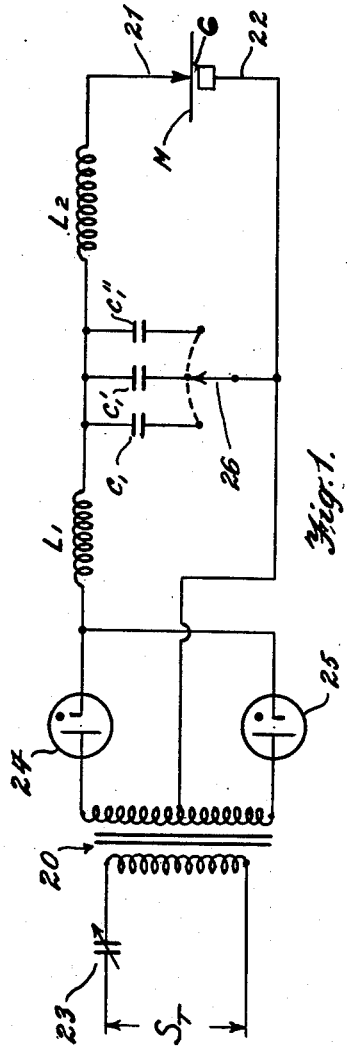
Fig. 1 is a schematic wiring diagram illustrating a discharge circuit embodying the present invention with manual controls.

Referring now to the drawings in detail, a basic circuit embodying the invention is illustrated in Fig. 1. In this circuit, there is a transformer 20 which is connected to a source $S_T$ of alternating current and supplies a current at high voltage to a set of opposing discharge electrodes 21 and 22. The electrodes are spaced from each other in the usual manner to form a spark gap G and a web of dielectric sheet material M is moved between the electrodes and through the spark gap.

The primary of the transformer 20 is connected to the source $S_T$ of alternating electrical energy through a current-limiting impedance 23 in the form of a variable condenser. It should be noted that in accordance with the present invention, the transformer 20 may be of a standard type that is suitable for use with the particular frequency of the source $S_T$ to which it is connected such as the usual 110 volt, sixty cycle alternating current.

The secondary or high voltage side of the transformer 20 is connected to one of the electrodes, in this case the electrode 21, through a pair of rectifier tubes 24 and 25 and smoothing inductances $L_1$ and $L_2$, and the secondary of the transformer 20 is also connected to the opposing electrode 22. A series of condensers $C_1$, $C_1'$ or $C_1''$ of varying capacities are connected in shunt across the electrodes 21 and 22 and the impedance $L_2$ through a switch 26 which may be set manually to connect one of the condensers or none in the circuit as desired. It will be understood that a bank of series-connected electrodes extending across the width of the sheet material in the manner shown and described in U. S. Patent No. 2,372,508 issued to John W. Meaker on March 27, 1945, or other suitable arrangement of electrodes may be used in place of the electrodes 21 and 22 in the circuit illustrated.

Figure 2:
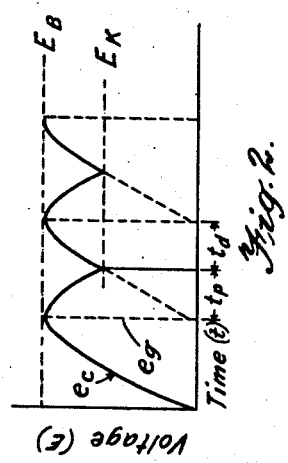
Fig. 2 is a graphical illustration in which voltages in the discharge circuit are represented as functions of time.

The operating principle of the circuit illustrated in Fig. 1 is similar to that of an inductor thyratron circuit. For example, assuming that the rectifier tubes 24 ad 25 deliver a substantially constant D. C. voltage to the pulse-forming circuit and that the switch 26 is set so as to connect the capacitor $C_1$ in shunt with the inductance $L_2$ and the electrodes 21 and 22, the condenser $C_1$ will be charged to a voltage $e_c$ in accordance with the following relation:

$$(1) \qquad e_c = E \sin \frac{1}{\sqrt{L_1 C_1}} t$$

where E is the potential of D. C. output of the rectifier tubes 24 and 25. As shown by the curves in Fig. 2, the condenser $C_1$ continues to charge until a breakdown voltage $E_B$ of the spark gap G between the electrodes is reached. When this occurs, the spark gap G becomes conductive, and the voltage across the spark gap G then falls to the minimum value that is required to maintain the arc between the electrodes. The voltage relationships involved are illustrated by the curves of Fig. 2 where the capacitor voltage $e_c$ (shown as a solid line) and the gap voltage $e_g$ after breakdown (shown as a dotted line) are represented as a function of time.

When the dielectric sheet material M is moved between the electrodes 21 and 22 and through the spark gap G, the electric arc or discharge passing between the electrodes and through the moving material will attempt to maintain itself in an ionized air path and will grow in length with the result that the voltage across the gap G will increase. During the discharge, the capacitor $C_1$ discharges through the inductance $L_2$, but when the voltage across spark gap G becomes equal to the capacitor voltage $e_c$, the arc discharge is extinguished and the following discharge does not take place until the capacitor $C_1$ has recharged to the breakdown voltage $E_B$ of the gap. The time it takes $C_1$ to recharge is the pulse-delay time, denoted by $t_d$ in Fig. 2, and may be expressed as:

$$(2) \qquad t_d = \sqrt{L_1 C_1} \left[ \sin^{-1} \frac{E_B}{E} - \sin^{-1} \frac{E_K}{E} \right]$$

where $E_K$ is the voltage at which the increasing gap voltage $e_g$ becomes equal to the decreasing capacitor voltage $e_c$. As shown by this equation, the delay time $t_d$ between pulses may be increased or decreased by increasing or decreasing the capacitance of the condenser $C_1$.

The pulse-duration time $t_p$ depends upon the speed at which the dielectric sheet material M is moving, the breakdown voltage of spark gap G and the rate at which the capacitor $C_1$ discharges through the impedance $L_2$. The impedance $L_2$ retards the rate at which the capacitor $C_1$ discharges through spark gap G as a very rapid discharge through a dielectric sheet material M will not provide sufficient time for the thermal effect of the discharge to take place in creating the perforation where such effect is desired as is usually the case.

The distance or spacing S at which successive arcs or discharges take place through the moving sheet of dielectric material M is given by the following equation:

$$(3) \qquad S = vt_d$$

where $v$ is the sheet velocity and $t_d$ is the pulse-delay time as defined above.

If in the circuit of Fig. 1, the manual switch 26 is open so that none of the capacitors $C_1$, $C_1'$ or $C_1''$ is connected in shunt across the inductance $L_2$ and the electrodes, and if the voltage delivered by the rectifier tubes 24 and 25 is assumed to be an ideal D. C. potential that is above the breakdown potential $E_B$ of the spark gap G, then current will flow through the inductances $L_1$ and $L_2$ and across the spark gap G. If the dielectric sheet material is moved between the electrodes 21 and 22, the ionized air path in spark gap G is lengthened and the arc potential across the spark gap G builds up until finally the extinction voltage of the air gap becomes equal to the breakdown voltage of the dielectric material. At this point, a new discharge through the dielectric material takes place. This relation may be expressed as $$(4) \qquad K_m h = K_e [h+d]$$

where $K_m$ denotes the dielectric strength of the sheet material (in volts per unit thickness), $h$ denotes the thickness of the dielectric sheet, $K_e$ denotes the extinction potential gradient of the ionized air path and $d$ denotes the length of the ionized air path exterior to the sheet material's surface. It should be noted in the above equation that $K_m$ and $K_e$ are proportionality factors relating the voltage applied across the gap to the thickness of the dielectric materials of the gap and are not necessarily constants. The extinction potential gradient $K_e$ of the ionized air path, in particular, is a function of the voltage applied across the gap.

From the foregoing equation, it will be apparent that the spacing S of successive perforations will be independent of the velocity at which the dielectric sheet material M moves when a condenser is not connected in shunt across the gap G. The length of the ionized air path $d$ will, thus, represent the minimum possible hole spacing attainable under any given set of physical conditions, and this may be altered by the mechanical design of the perforating unit.

Figure 3:
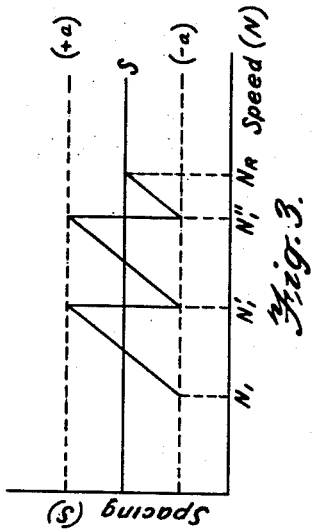
Fig. 3 is a graphical illustration in which the spacing of the perforations is represented as a function of the speed at which the material being perforated is moving.

The curves shown in Fig. 3, illustrate the manner in which the spacing S of successive perforations may be varied within the limits of the particular apparatus to compensate for an increase in speed N at which the dielectric sheet material is moving by varying the capacitance in the pulse-forming circuit. Assuming, for example, that the perforating apparatus is to be operated at a speed $N_1$, which will be the minimum speed at which it is safe to apply an electric arc to the dielectric sheet material and still preclude the possibility of combustion, and the spacing S between successive perforations (with tolerance limits of this spacing of $\pm a$) is desired, the capacity of the condenser $C_1$, as determined by the foregoing equations, should be such that its pulse delay characteristic will result in a perforation spacing of $S-a$ at the speed $N_1$. However, when the dielectric speed increases to $N_1'$, the spacing of the perforations produced by the condenser $C_1$ will change to $S+a$. To overcome this, the capacity of the condenser $C_1'$ having a pulse-delay characteristic required for a perforation spacing of $S-a$ at speed $N_1'$ is then connected in the circuit by the switch 26. If the speed of the sheet material is increased further to the speed $N_1''$, the hole spacing will again increase to the value $S+a$ with the condenser $C_1'$ in the circuit. Thus, the speed at $N_1''$, the third condenser $C_1''$ which has a capacity resulting in a pulse delay characteristic required to produce a perforation spacing of $S-a$ at the speed $N_1''$ is connected in connected in the circuit by the switch 26 and this again reduces the perforation spacing to the lower limit $S-a$. Finally, at rated speed $N_R$, the hole spacing is increased from $S-a$ to $S$. The number of condensers employed in this speed-compensation system will be determined by both the speed range within which the dielectric sheet material M is moved and the tolerance limits it is desired to maintain. It will also be noted that the condenser having the greatest capacity is connected in the circuit when operating at the lowest speed. Thus, in Fig. 1, the capacitance of the condenser $C_1$ will be greater than that of the condenser $C_1'$ which in turn will be greater than the capacity of the condenser $C_1''$.

In considering the porosity of a sheet material, two factors must be accounted for. The first of these factors is the perforation density or the number of perforations per unit of surface area, and the second of these factors is the size of the individual perforations. For a given perforation density, the larger the perforation, the greater will be the porosity, etc. When a perforation is created in a dielectric sheet material by an electric arc, the size of the perforation is directly related to the thermal energy of the arc. The thermal energy W of an electric arc may be expressed by the following equation:

(5) $$W = ki^2 R t_p$$

This relationship is based on the assumption that the arc acts as a resistor R and where $i^2$ is the mean square value of the current of arc, $t_p$ is the time duration of the pulse (previously defined) and $k$ is a proportionality or conversion factor relating units of electrical energy to units of thermal energy.

The thermal energy W of the discharge is represented by the curves of Fig. 4 as a function of the pulse duration time $t_p$ for two different root-mean-square (or effective) current values $i_1$ and $i_2$, and by the curves of Fig. 5 as a function of the effective arc current $i$, for two different pulse-duration time intervals $t_{p_1}$ and $t_{p_2}$. From these curves, it will be seen that if a desired thermal energy of the discharge having a value $W_1$ is attained with an effective arc current $i_1$ acting over a time interval $t_{p_1}$ for each perforation, and that if shortening the time interval from $t_{p_1}$ to $t_{p_2}$ reduces the thermal energy of the discharge to a value $W_2$, an increase in effective arc current from $i_1$ to $i_2$ must be effected in order to restore the thermal energy of the discharge to the desired value $W_1$.

Any suitable means may be employed to vary the arc current $i$. For example, as shown in Fig. 1, the impedance in the form of the variable condenser 23 is connected in series with the primary of the transformer 20 for this purpose.

The curve shown in Fig. 6 represents the transformer current $i$ as a function of the impedance in the circuit and illustrates the manner in which the current $i$ flowing in a typical high-voltage transformer varies in response to variations in the capacity of the condenser 23. For capacities of the condenser 23 between $C_n$ and zero, the effective secondary current delivered by transformer 20 can be varied from the rated current $i_r$ to zero along the line $i_t$. When the capacity of the condenser 23 is increased above the capacitance $C_n$, current greater than rated current will flow in the transformer and the use of such a capacity may be injurious to the transformer windings because of the resonance effect illustrated by the dotted lines in Fig. 6. Since variation of the capacity of the condenser 23 will result in variation of the secondary current of the transformer, the condenser 23 is of a variable type so that its capacity may be set to provide the size of the perforation desired. Thus, with a given density of perforations, the control of the perforation size controls the sheet-material porosity.

As will now be described, the manual controls described above for regulating the distribution of the perforations and the size of the perforations may be automatically regulated in such a manner as to yield and to maintain any desired porosity, within the design limits of the particular machine.

First, an automatic system for maintaining the hole spacing or the number of perforations per unit of area at a desired value irrespective of variations of the sheet material speed will be described. The basic components of such a system are shown in Fig. 7. In this system, there is a device capable of sensing the velocity at which the sheet material M is moving. The velocity-sensing device consists of a friction roller 27 that rides on the surface of and is driven by the linear motion of the sheet material M. The friction roller 27 is connected to and drives a D. C. generator 28 which functions as a tachometer to measure the velocity at which the sheet material M is moving by generating a D. C. voltage (an A. C. system may also be used with equal effectiveness) the magnitude of which will be directly proportional to the linear velocity of the sheet material M. The voltage thus generated is fed to an electronic relay control circuit 28a, the details of which are shown in Fig. 8, which has its output connected to a relay system 32, the details of which are shown in Fig. 9. The relay-control system in turn controls switches in the discharge circuit.

In the relay control circuit, as shown in Fig. 8, the voltage from the generator 28 is applied as a positive bias to the grid of amplifier tube 29 which forms the first stage of a D. C. amplifier having an odd number of stages. The output of the tube 29 is connected to the grid of a tube 30 and the output of the tube 30 is connected to the grid of a third tube 31, the load of which consists of coils 32a, 32b, 32c and 32d of the relay system 32. A bias voltage is applied to the grids of the tubes 29 and 31 in the usual manner from sources $E_g$ and $E_g'$. These biasing voltages may be varied, as desired, to change the output of the circuit. Thus, an increase in the positive bias tween successive perforations (with tolerance limits of this spacing of $\pm a$) is desired, the capacity of the condenser $C_1$, as determined by the foregoing equations, should be such that its pulse delay characteristic will result in a perforation spacing of $S-a$ at the speed $N_1$. However, when the dielectric speed increases to $N_1'$, the spacing of the perforations produced by the condenser $C_1$ will change to $S+a$. To overcome this, the capacity of the condenser $C_1'$ having a pulse-delay characteristic required for a perforation spacing of $S-a$ at speed $N_1'$ is then connected in the circuit by the switch 26. If the speed of the sheet material is increased further to the speed $N_1''$, the hole spacing will again increase to the value $S+a$ with the condenser $C_1'$ in the circuit. Thus, the speed at $N_1''$, the third condenser $C_1''$ which has a capacity resulting in a pulse delay characteristic required to produce a perforation spacing of $S-a$ at the speed $N_1''$ is connected in connected in the circuit by the switch 26 and this again reduces the perforation spacing to the lower limit $S-a$. Finally, at rated speed $N_R$, the hole spacing is increased from $S-a$ to $S$. The number of condensers employed in this speed-compensation system will be determined by both the speed range within which the dielectric sheet material M is moved and the tolerance limits it is desired to maintain. It will also be noted that the condenser having the greatest capacity is connected in the circuit when operating at the lowest speed. Thus, in Fig. 1, the capacitance of the condenser $C_1$ will be greater than that of the condenser $C_1'$ which in turn will be greater than the capacity of the condenser $C_1''$.

In considering the porosity of a sheet material, two factors must be accounted for. The first of these factors is the perforation density or the number of perforations per unit of surface area, and the second of these factors is the size of the individual perforations. For a given perforation density, the larger the perforation, the greater will be the porosity, etc. When a perforation is created in a dielectric sheet material by an electric arc, the size of the perforation is directly related to the thermal energy of the arc. The thermal energy W of an electric arc may be expressed by the following equation:

(5) $\qquad W = k i^2 R t_p$

This relationship is based on the assumption that the arc acts as a resistor R and where $i^2$ is the mean square value of the current of arc, $t_p$ is the time duration of the pulse (previously defined) and $k$ is a proportionality or conversion factor relating units of electrical energy to units of thermal energy.

The thermal energy W of the discharge is represented by the curves of Fig. 4 as a function of the pulse duration time $t_p$ for two different root-mean-square (or effective) current values $i_1$ and $i_2$, and by the curves of Fig. 5 as a function of the effective arc current $i$, for two different pulse-duration time intervals $t_{p_1}$ and $t_{p_2}$. From these curves, it will be seen that if a desired thermal energy of the discharge having a value $W_1$ is attained with an effective arc current $i_1$ acting over a time interval $t_{p_1}$ for each perforation, and that if shortening the time interval from $t_{p_1}$ to $t_{p_2}$ reduces the thermal energy of the discharge to a value $W_2$, an increase in effective arc current from $i_1$ to $i_2$ must be effected in order to restore the thermal energy of the discharge to the desired value $W_1$.

Any suitable means may be employed to vary the arc current $i$. For example, as shown in Fig. 1, the impedance in the form of the variable condenser 23 is connected in series with the primary of the transformer 20 for this purpose.

The curve shown in Fig. 6 represents the transformer current $i$ as a function of the impedance in the circuit and illustrates the manner in which the current $i$ flowing in a typical high-voltage transformer varies in response to variations in the capacity of the condenser 23. For capacities of the condenser 23 between $C_n$ and zero, the effective secondary current delivered by transformer 20 can be varied from the rated current $i_r$ to zero along the line $i_t$. When the capacity of the condenser 23 is increased above the capacitance $C_n$, current greater than rated current will flow in the transformer and the use of such a capacity may be injurious to the transformer windings because of the resonance effect illustrated by the dotted lines in Fig. 6. Since variation of the capacity of the condenser 23 will result in variation of the secondary current of the transformer, the condenser 23 is of a variable type so that its capacity may be set to provide the size of the perforation desired. Thus, with a given density of perforations, the control of the perforation size controls the sheet-material porosity.

As will now be described, the manual controls described above for regulating the distribution of the perforations and the size of the perforations may be automatically regulated in such a manner as to yield and to maintain any desired porosity, within the design limits of the particular machine.

First, an automatic system for maintaining the hole spacing or the number of perforations per unit of area at a desired value irrespective of variations of the sheet material speed will be described. The basic components of such a system are shown in Fig. 7. In this system, there is a device capable of sensing the velocity at which the sheet material M is moving. The velocity-sensing device consists of a friction roller 27 that rides on the surface of and is driven by the linear motion of the sheet material M. The friction roller 27 is connected to and drives a D. C. generator 28 which functions as a tachometer to measure the velocity at which the sheet material M is moving by generating a D. C. voltage (an A. C. system may also be used with equal effectiveness) the magnitude of which will be directly proportional to the linear velocity of the sheet material M. The voltage thus generated is fed to an electronic relay control circuit 28a, the details of which are shown in Fig. 8, which has its output connected to a relay system 32, the details of which are shown in Fig. 9. The relay-control system in turn controls switches in the discharge circuit.

In the relay control circuit, as shown in Fig. 8, the voltage from the generator 28 is applied as a positive bias to the grid of amplifier tube 29 which forms the first stage of a D. C. amplifier having an odd number of stages. The output of the tube 29 is connected to the grid of a tube 30 and the output of the tube 30 is connected to the grid of a third tube 31, the load of which consists of coils 32a, 32b, 32c and 32d of the relay system 32. A bias voltage is applied to the grids of the tubes 29 and 31 in the usual manner from sources $E_g$ and $E_g'$. These biasing voltages may be varied, as desired, to change the output of the circuit. Thus, an increase in the positive bias Es which is calibrated to porosity, is fed to an amplifying and relay-controlling unit 49d which consists of an amplifier tube 56 and a relay-controlling tube 57.

The output of the amplifying tube 56, which is the difference signal, is applied to the grid of a relay-controlling tube 57 as a biasing voltage. The output of the relay-controlling tube 57 is connected to coils 58a and 59a of relays 58 and 59, respectively, of a voltage-regulating system indicated generally at 60 in Fig. 10. When the biasing voltage applied to the tube 57 reaches a predetermined positive value, it causes the relay 58 to be operated to close the contacts in a circuit connecting a reversible electric motor 60a to a source of power $S_M$ for operation of the motor in one direction. When the bias voltage applied to the relay tube 57 reaches a predetermined negative value, the output from the tube 57 causes the relay 59 to be operated to close a circuit reversing the direction in which the motor 60a is driven.

The motor 60a is connected to drive the contact arm 61 of a potentiometer 62 (or in the case of an A. C. source, a variac) through suitable speed-reducing gearing. The position of the potentiometer arm 61 determines the voltage that is applied to the coils 63a through 63g of a relay system, indicated generally at 63 in Fig. 10 from a source of power $S_R'$. The relay system 63 controls contacts which connect the primary of transformer 20 to the source of power $S_T$ through one or more of a series of condensers 64, 65 and 66 of different capacities or through a shorting line 67 and thus, provides a variable current control similar to the condenser 23 previously described in conjunction with the circuit shown in Figs. 1 and 6.

Referring to the circuit of Fig. 11 in greater detail, it should be noted that the electronic adding unit 49a which consists of the tubes 51, 52 and 53, is a conventional electronic adding circuit. A requirement of this adding circuit is that the transfer gain be high (approximately 1000). The tubes 51, 52 and 53 are represented as triodes, but pentodes may be employed. Also, refinements, such as zeroing controls, may be added to the circuit in a conventional manner. In this circuit, the output of the adding circuit will be the sum of the photocell voltages multiplied by a factor which is the ratio of the feedback resistance to the input resistance in the circuit.

If $E_2$ represents the signal voltage applied to the grid of the tube 54 of the comparator unit 49c from the adding unit 49a through the integrating network 49b and $E_1$ represents the reference voltage Es (which is calibrated to porosity), then the difference voltage E that is applied to the grid of the amplifier tube 56 is given by the following equation:

(6) $$E = \frac{E_1 R_1}{2 R_k} + g_m \frac{R_1}{2}(E_1 - E_2)$$

where $g_m$ is the transconductance of each of the tubes 54 and 55. This equation presupposes that the product $g_m R_k$ is considerably greater than one. In Fig. 13, the difference or output voltage E of the comparator unit 49d is represented as a function of the voltage $E_1 - E_2$ for two values of $E_1$ and the curves illustrated in Fig. 14 represent the operating characteristics of the relay tube 57. Assuming that when the voltage $E_1 - E_2$ is zero, the difference voltage E is at point 1 on the curves of Fig. 13, the corresponding value on the operating characteristic of the relay tube 57 is found at point r in Fig. 14. As $E_1 - E_2$ becomes positive, the operating point r of the relay tube 57 moves along the relay load line toward point s and in so doing causes the relay 58 to operate due to the increased current. However, when the reference voltage $E_1$ is changed in the curves of Fig. 13 to point 2, it is apparent that the relay 58 would operate even though $E_1 - E_2$ is zero. To compensate for this, a negative bias voltage is applied to the grid of the relay tube 57 from a source of voltage Ec and this bias is made sufficiently negative so that the operating point r in Fig. 11 on the tube characteristic curve returns to its initial position at point r. Consequently, the bias voltage applied from the source Ec must be mechanically synchronized to the reference voltage Es that is applied to the tube 55 so that when Ec is made more positive, Es is made more negative and vice versa.

The details of the relay system 63 which is operated by the coils 63c through 63g are illustrated in Fig. 12. In this system relays 80, 81, 82, 83, 84, 85 and 86 control contacts providing an eight-step, current-limiting sequence of operations in which the condensers 64, 65 and 66 and a shorting line 67 are connected in the transformer circuit individually or in various combinations. When the potential of the potentiometer 62 is at its lowest point, the contacts of all the relays remain open and the condenser 64 which has the smallest capacity, is then connected in series with the primary of the transformer. As the arm 61 of the potentiometer 62 advances to increase the voltage supplied to the relay coils, the voltage applied to the coil 63a causes the relay 80 to operate to disconnect the condenser 64 and connect the condenser 65 which has a greater capacity in the transformer circuit. As the arm 61 of the potentiometer 62 progresses and the voltage applied to the relay coils 63a through 63g increases, the relays 80, 81, 82, 83, 84, 85 and 86 operate successively in that order. Corresponding to this sequence of relay operations, the current-limiting capacity connected in the primary circuit of transformer successively consists of the condensers 64; 65; 66; 64+65; 64+66; 65+66; and 64+65+66. The final step resulting from operation of relay 86 is the short-circuiting of the capacity impedances 64, 65 and 66 through the line 67 which permits the flow of rated current, here considered the maximum, to the transformer 20.

At the end of the potentiometer's run, the arm 61 thereof strikes a microswitch 70, indicated in Fig. 11, which, when actuated, closes an alarm circuit which connects a light or other suitable warning device 70a and a relay 71 to the source of power $S'_R$. The relay 71 when energized opens the forward driving circuit of the motor 60a thus stopping the potentiometer movement at its upper limit and the alarm 70a simultaneously indicates, visibly or audibly, that the apparatus is operating at its maximum capacity but that the maximum is not enough to produce the desired porosity as indicated on the porosity selector.

Once the microswitch 70 has been actuated, the reversing relay 59 must be energized to drive the motor 60a away from the microswitch and a push button switch 72 which opens the circuit to the coil 59a of the relay 59 when manually depressed is provided for this purpose. It should be noted that the operation of the switch 72 may be made automatic by another relay system if so desired. Also, a second microswitch may be installed at the lower end of the potentiometer traverse as a low-end limiter if desired.

In the system illustrated in Fig. 15, the automatic control systems just described for maintaining the spacing of the perforations and the size of the perforations are utilized in the same discharge circuit. The manner in which these control systems operate will be the same as previously described and need not be repeated here in detail. The operation of the automatic control systems in conjunction with the operation of the perforating apparatus may be summarized as follows:

First, the operation of the automatic perforation-spacing system will be described. Assuming that at the rated speed of sheet-material operation a perforation spacing S is desired and that the condenser $C_1$ will provide the proper capacity to maintain the desired hole spacing S when the machine is operating at its rated speed, the condenser $C_1$ is connected in the electrode circuit by the switch 26. As the sheet material M starts moving between the electrodes (or banks of electrodes) from a zero velocity, no current is being generated by the tachometer generator 27 and there is not output from the amplifier tube 31 and hence, no current flows through the relay coils 32a, 32b, 32c and 32d so that the solenoid operated switches 39a and 40a remain open. As the sheet material gains velocity, the tachometer generator generates a positive voltage which is applied to the tube 29 so that it then becomes conductive and current begins to flow through the tubes 30 and 31 and the relay coils 32a through 32d. When the current flowing in the relay coils reaches a predetermined level, the contacts 35 are closed causing the switches 39a and 40a in the electrode circuit to be closed. It should be noted that this point of electrode operation may be varied by regulation of the bias voltages $E_g$ and $E_{g'}$ in the amplifier circuit.

When contacts 35 are closed, the maximum pulse-delay capacity $C_1+C_2+C_3$ is connected in the electrode circuit. However, as the speed of the sheet material increases, the voltage applied to the tube 29 increases and causes an increase in the current flowing through relay coils 32a through 32d. This increase in current causes the contacts 36, 37 and 39 to be closed in the sequence described above so that increases in the sheet-material velocity cause a decrease in the pulse-delay capacity in the electrode circuit, and the pulse-repetition rate is kept in step (within the tolerance limits of the particular apparatus) with the speed of operation.

The automatic current-control system controls the size or area of the individual perforations for a given distribution of perforations so as to maintain the desired porosity. Assuming that a porosity X is desired in a particular sheet material, the voltage $E_s$ is first set at the calibrated voltage for this porosity. Then, if the positive voltage on the grid of the tube 54 is below the calibrated bias voltage $E_s$ applied to the tube 55, it indicates the desired porosity is not being attained, a negative bias on the tube 56 will result. Thus, increased current will then flow through the tube 57 whose anode load consists of the directional relays 58 and 59 which operate the potentiometer drive. When the output of the tube 57 reaches a predetermined positive value, the relay 58 operates and the motor 60a drives the potentiometer arm 61 in a direction which increases the voltage applied to the coils 63a through 63g of the relays 80 through 86 in the current-limiting relay system 63. As the voltage on the relay coils increases, the relays 80 through 86 operate in sequence so that the capacity in the primary circuit of the transformer 20 is increased as required and more current flows in the secondary circuit of the transformer until the rated current of the transformer is reached. This results in an increase of the effective arc current or the thermal energy of the electrode discharges and consequently the size of the perforations become larger. When this occurs more light will strike the photocells and this will increase the positive bias on the tube 54. The increase in the current flowing through tube 54 decreases the difference voltage on the grid of the tube 56 which in turn reduces the output of the tube 57. When the output of the tube 57 decreases below the operating level of relay 85, the relay opens and the potentiometer-drive motor 60 is stopped. Assuming that at this voltage level relays 80, 81, 82 and 83 have been operated, the capacitors 64+65 will be connected in the primary circuit of the transformer and the resulting secondary current of the transformer produces an effective arc current which provides the desired porosity to the sheet material for the pulse frequency at which the apparatus is operating.

It will be understood that various changes and modifications in the embodiment of the invention illustrated and described herein may be made by those skilled in the art without departing from the scope of the invention as defined by the following claims.

I claim:

1. In an apparatus for perforating dielectric sheet material by means of electrical discharges wherein a moving web of the sheet material passes between opposing spaced electrodes and pulses of electrical current are discharged between the electrodes and through the sheet material, the combination which includes a transformer having its primary connected to a source of alternating current and its secondary connected to opposing spaced electrodes, means for controlling the thermal energy of discharges between the electrodes, said means comprising a variable current-limiting impedance connected in circuit with the transformer, means for rectifying the output of the transformer, said rectifying means being connected in series with the secondary of the transformer and the electrodes, the transformer and the rectifying means supplying current to the electrodes at a voltage above the breakdown voltage across the electrodes with a sheet of dielectric material therebetween, means in the secondary circuit of the transformer for controlling the frequency of the discharges occurring between said electrodes, and means for measuring the porosity of the perforated sheet material, means for comparing the measured porosity with a selected porosity and means for varying the current-limiting impedance in accordance with variations between the measured porosity and the selected porosity to maintain the porosity of the perforated sheet material at the selected porosity within fixed limits.

2. In an apparatus for perforating dielectric sheet material by means of electrical discharges wherein a moving web of the sheet material passes between opposing spaced electrodes and pulses of electrical current are discharged between the electrodes and through the sheet material, the combination which includes a transformer having its primary connected to a source of alternating current and its secondary connected to opposing spaced electrodes, means for controlling the thermal energy of discharges occurring between the electrodes, said means comprising a variable current-limiting impedance connected in circuit with the transformer, means for rectifying the output of the transformer, said rectifying means being connected in series with the secondary of the transformer and the electrodes, the transformer and the rectifying means supplying current to the electrodes at a voltage above the breakdown voltage across the electrodes with a sheet of dielectric material therebetween, means in the secondary circuit of the transformer for controlling the frequency of the discharges occurring between said electrodes, means for measuring the porosity of the perforated sheet material, means for comparing the measured porosity of the perforated sheet material with a selected porosity, means for varying the current-limiting impedance in accordance with variations between the measured porosity and the selected porosity to maintain the porosity of the perforated sheet material at the selected porosity within the fixed limits and means for automatically maintaining the frequency of the discharges at a given frequency per unit of length of the sheet material upon variations in the speed at which the sheet material moves between the electrodes.

3. In an apparatus for perforating dielectric sheet material by electrical discharges wherein a moving web of the sheet material passes between opposing spaced electrodes and pulses of electrical current are discharged between the electrodes and through the sheet material, the combination which includes a transformer having its primary connected to a source of alternating current and its secondary connected to opposing spaced electrodes, means for controlling the thermal energy of discharges between the electrodes, said means comprising a variable current-limiting impedance connected in circuit with the transformer, means for rectifying the output of the transformer, said rectifying means being connected in series with the secondary of the transformer and the electrodes, the transformer and the rectifying means supplying current to the electrodes at a voltage above the breakdown voltage across the electrodes with a sheet of dielectric material therebetween, means in the secondary circuit of the transformer for controlling the frequency of the discharge occurring between said electrodes, means for measuring the porosity of the perforated sheet of dielectric material after the sheet passes between the electrodes and transducing the measured porosity into an electrical impulse that is proportional thereto, means for integrating and amplifying said electrical impulse, means for comparing the output of the amplifier with a standard signal, said standard signal being calibrated in terms of porosity, the output of said comparing means being the difference between the standard signal and the amplified electrical impulse, means for amplifying the output of said comparing means, the output of said last-mentioned amplifier being at all times proportional to the difference between the amplified electrical impulse and the standard signal and means controlled by the magnitude and the polarity of the difference signal for varying the current-limiting impedance in the transformer circuit.

4. In an apparatus for perforating dielectric sheet material by electrical discharges, the combination as defined in claim 3 wherein there is a plurality of means for measuring the porosity of the perforated sheet material and transducing the measured porosity into an electrical impulse proportional thereto and which includes means for adding the electrical impulses produced by said measuring means.

5. In an apparatus for perforating dielectric sheet material by electric discharges wherein a moving web of the sheet material passes between opposing spaced electrodes and pulses of electrical current are discharged between the electrodes and through the sheet material, the combination which includes a transformer having its primary connected to a source of alternating current and its secondary connected to opposing spaced electrodes, means for controlling the thermal energy of discharges occurring between the electrodes, said means comprising a variable current-limiting impedance connected in circuit with the transformer, means for rectifying the output of the transformer, said rectifying means being connected in series with the secondary of the transformer and the electrodes, the transformer and the rectifying means supplying current to the electrodes at a voltage above the breakdown voltage across the electrodes with a sheet of dielectric material therebetween, means in the secondary circuit of the transformer for controlling the frequency of the discharges occurring between said electrodes, tachometric means driven by the moving sheet material, said tachometric means producing an electrical voltage proportional to the speed at which the dielectric material is moving, means for amplifying the voltage generated by the tachometric means, relays connected to and operable by said amplifying means in response to changes in the output thereof and contacts controlled by the operation of said relays for connecting capacitive elements in the circuit connecting the electrodes to the transformer, the capacity of the capacitive elements connected thereby in said circuit varying inversely with respect to changes in the speed at which dielectric sheet material is moving.

6. In an apparatus for perforating dielectric sheet material by electric discharges wherein a moving web of the sheet material passes between opposing spaced electrodes and pulses of electrical current are discharged between the electrodes and through the sheet material, the combination which includes a transformer having its primary connected to a source of alternating current and its secondary connected to opposing spaced electrodes, means for controlling the thermal energy of discharges occurring between the electrodes, said means comprising a variable current-limiting impedance connected in circuit with the transformer, means for rectifying the output of the transformer, said rectifying means being connected in series with the secondary of the transformer and the electrodes, the transformer and the rectifying means supplying current to the electrodes at a voltage above the breakdown voltage across the electrodes with a moving sheet of dielectric material therebetween, means in the secondary circuit of the transformer for controlling the frequency of the discharges occurring between said electrodes, means for measuring the porosity of the perforated sheet of dielectric material after the sheet passes between the electrodes and transducing the measured porosity into an electrical impulse that is proportional thereto, means for integrating and amplifying said amplified electrical impulse, means for comparing the amplified impulse with a standard signal, said standard signal being calibrated in terms of porosity, the output of said comparing means representing the difference between the standard signal and the amplified electrical impulse, means for amplifying said difference signal, the output of said last-mentioned amplifier being at all times proportional to the difference between the amplified electrical impulse and the standard signal, means controlled by the magnitude and the polarity of the difference signal for varying the current-limiting impedance in the transformer circuit, tachometric means driven by the moving sheet material, said tachometric means producing an electrical voltage proportional to the speed at which the dielectric material is moving, means for amplifying the voltage generated by the tachometric means, relays connected to and operable by said amplifying means in response to changes in the output thereof and contacts controlled by the operation of said relays for connecting capacitive elements in the circuit connecting the electrodes to the transformer, the capacity of the capacitive elements connected thereby varying inversely with respect to changes in the speed at which dielectric sheet material is moving.

7. In an apparatus for perforating dielectric sheet material by electrical discharges wherein a moving web of the sheet material passes between opposing spaced electrodes and pulses of electrical energy are discharged periodically between said electrodes and through the moving sheet material, an automatic porosity-control system consisting of means for measuring the porosity of a moving sheet of dielectric material having perforations therein and transducing the measured porosity into an electrical impulse that is proportional thereto, means for amplifying and integrating said electrical impulse, means for comparing the amplified electrical impulse with a standard signal, said standard signal being calibrated in terms of porosity, means for amplifying the difference between the standard signal and the amplified electrical impulse with the output of said last-mentioned amplifier being at all times proportional to the difference between the amplified electrical impulse and the standard signal and means controlled by the magnitude and the polarity of the difference signal for varying a current-limiting impedance in a circuit connecting the electrodes to a source of electrical energy.

8. In an apparatus for perforating dielectric sheet material by electrical discharges wherein a moving web of the sheet material passes between opposing spaced electrodes and pulses of electrical energy are discharged periodically between said electrodes and through the moving sheet material, an automatic porosity-control system consisting of means for measuring the porosity of a moving sheet of dielectric material having perforations therein and transducing the measured porosity into an electrical impulse that is proportional thereto, means for amplifying and integrating said electrical impulse, means for comparing the amplified electrical impulse with a standard signal, said standard signal being calibrated in terms of porosity, means for amplifying the difference between the standard signal and the amplified electrical impulse with the output of said last-mentioned amplifier being at all times proportional to the difference between the amplified electrical impulse and the standard signal, means controlled by the magnitude and the polarity of the difference signal for varying a current-limiting impedance in a circuit connecting the electrodes to a source of electrical energy and warning means operable by said last-mentioned means for indicating operation of the system at one limit of its capacity.

9. In an apparatus for perforating dielectric sheet material by means of electrical discharges wherein a moving web of the sheet material passes between spaced electrodes and pulses of electrical energy are discharged between said electrodes, the combination of a transformer having its primary connected to a source of electrical energy and its secondary connected to spaced electrodes between which a web of dielectric sheet material is moved, rectifying means connected to the secondary of the transformer, impedances connected in series with the rectifying means and one of the electrodes, a series of impedances of varying capacity, manually operable switching means for connecting one of the series of impedances in a shunt circuit with the electrodes and one of the first-mentioned impedances, a second series of impedances, and automatic means for connecting the impedances of said second series of impedances in said shunt circuit, said automatic means comprising means for measuring the speed of moving web of sheet material and generating an electrical voltage proportional thereto, relays controlled by said voltage, and switches operated by said relays for connecting the impedances of the second series of impedances in shunt with the electrodes.

10. In an apparatus for perforating dielectric sheet material by means of electrical discharges wherein a moving web of the sheet material passes between spaced electrodes and pulses of electrical energy are discharged between said electrodes, the combination of a transformer having its primary connected to a source of electrical energy and its secondary connected to spaced electrodes between which a web of dielectric sheet material is moved, a series of current-limiting impedances, switches connecting said current-limiting impedances in series with the primary of the transformer and the source of electrical energy, a series of relays operating said switches, said relays being connected to a source of electrical energy and being operable at different voltages, respectively, means for measuring the porosity of the sheet material following perforation thereof and transducing the measured porosity into an electrical signal, means for comparing said electrical signal with a standard electrical signal corresponding to a selected porosity and means responsive to the difference in voltage between the measured signal and the standard signal for varying the voltage supplied to the switch-operating relays.

11. In an apparatus for perforating dielectric sheet material by means of electrical discharges wherein a moving web of the sheet material passes between spaced electrodes and pulses of electrical energy are discharged between said electrodes, the combination of a transformer having its primary connected to a source of electrical energy and its secondary connected to spaced electrodes between which a web of dielectric sheet material is moved, a series of current-limiting impedances, switches connecting said current-limiting impedances in circuit with the primary of the transformer, a series of relays operating said switches, said relays being connected to a source of electrical energy and being operable at different voltages, respectively, means for measuring the porosity of the sheet material following perforation thereof and transducing the measured porosity into an electrical signal, means for comparing said electrical signal with a standard electrical signal corresponding to a selected porosity, means responsive to the difference in voltage between the measured signal and the standard signal for varying the voltage supplied to the switch-operating relays and an alarm circuit operable by said voltage-responsive means, said alarm circuit being operated upon the voltage of the voltage-responsive means exceeding one limit thereof.

12. In an apparatus for perforating dielectric sheet material by means of electrical discharges wherein a moving web of the sheet material passes between spaced electrodes and pulses of electrical energy are discharged between said electrodes, the combination of a transformer having its primary connected to a source of electrical energy and its secondary connected to spaced electrodes between which a web of dielectric sheet material is moved, rectifying means connected to the secondary of the transformer, impedances connected in series with the rectifying means and one of the electrodes, a series of impedances of varying capacity, manual switching means for connecting one of the series of impedances in shunt with the electrodes and one of the first-mentioned impedances, a second series of capacitive impedances, automatic means for connecting the capacitive impedances of the second series of impedances in shunt with the electrodes, said automatic means comprising means for measuring the speed of the moving web of sheet material and generating an electrical voltage proportional thereto, relays controlled by the voltage generated by the speed-measuring means and switches operated by said relays for the impedances of the second series of impedances in shunt with the electrodes, a series of current-limiting impedances, switches connecting said current-limiting impedances in circuit with the primary of the transformer, a series of relays for operating said switches, said relays being connected to a source of electrical energy and being operable at different voltages, respectively, means for measuring the porosity of the sheet material following perforations thereof and transducing the measured porosity into an electrical signal, means for comparing said electrical signal with a standard electrical signal corresponding to a selected porosity and means responsive to the difference in voltage between the measured signal and the standard signal for varying the voltage supplied to the switch-operating relays.

13. In an apparatus for perforating dielectric sheet material by means of electrical discharges wherein a moving web of the sheet material passes between spaced electrodes and pulses of electrical energy are discharged between said electrodes, the combination of a transformer having its primary connected to a source of electrical energy and its secondary connected to spaced electrodes between which a web of dielectric sheet material is moved, rectifying means connected in the circuit connecting the secondary of the transformer to the electrodes, impedances connected in series with the rectifying means and the electrodes, a relay-controlled switch in the circuit connecting the transformer to the electrodes, a series of impedances of varying capacity, manual switching means for connecting one of the series of impedances in shunt with the electrodes and one of the first-mentioned impedances, a second series of capacitive impedances, and automatic means for connecting the capacitive impedances of the second series of impedances in shunt with the electrodes and for closing the switch in the circuit connecting the transformer to the electrodes, said automatic means comprising means for measuring the speed of the moving web of sheet material and generating an electrical voltage proportional thereto and switch-operating relays controlled by the voltage generated by the speed-measuring means, said relays operating the switch in the circuit connecting the transformer to the electrodes and switches connecting the impedances of the second series of impedances in shunt with the electrodes.

14. In an apparatus for perforating dielectric sheet material by means of electrical discharges wherein a moving web of the sheet material passes between spaced electrodes and pulses of electrical energy are discharged between said electrodes, the combination of a transformer having its primary connected to a source of electrical energy and its secondary connected to spaced electrodes between which a web of dielectric sheet material is moved, rectifying means connected in the circuit connecting the secondary of the transformer to the electrodes, impedances connected in series with the rectifying means and the electrodes, a relay-controlled switch in the circuit connecting the transformer to the electrodes, a series of impedances of varying capacity, manual switching means for connecting one of the series of impedances in shunt with the electrodes and one of the first-mentioned impedances, a second series of capacitive impedances, automatic means for connecting the capacitive impedances of the second series of impedances in shunt with the electrodes and for closing the switch in the circuit connecting the transformer to the electrodes, said automatic means comprising means for measuring the speed of the moving web of sheet material and generating an electrical voltage proportional thereto and switch-operating relays controlled by the voltage generated by the speed-measuring means, said relays operating the switch in the circuit connecting the transformer to the electrodes and switches connecting the impedances of the second series of impedances in shunt with the electrodes, a series of current-limiting impedances, switches connecting said current-limiting impedances in circuit with the primary of the transformer, a series of relays for operating said switches, said relays being connected to a source of electrical energy and being operable at different voltages, respectively, means for measuring the porosity of the sheet material following perforations thereof and transducing the measured porosity into an electrical signal, means for comparing said electrical signal with a standard electrical signal corresponding to a selected porosity, and means responsive to the difference in voltage between the measured signal and the standard signal for varying the voltage supplied to the switch-operating relays.

15. In an apparatus for perforating dielectric sheet material by means of electrical discharges wherein a moving web of the sheet material passes between spaced electrodes and pulses of electrical energy are discharged between said electrodes, the combination of a transformer having its primary connected to a source of electrical energy and its secondary connected to spaced electrodes between which a web of dielectric sheet material is moved, rectifying means connected in the circuit connecting the secondary of the transformer to the electrodes, impedances connected in series with the rectifying means and the electrodes, a relay-controlled switch in the circuit connecting the transformer to the electrodes, a series of impedances of varying capacity, manual switching means for connecting one of the series of impedances in shunt with the electrodes and one of the first-mentioned impedances, a second series of capacitive impedances, automatic means for connecting the capacitive impedances of the second series of impedances in shunt with the electrodes and for closing the switch in the circuit connecting the transformer to the electrodes, said automatic means comprising means for measuring the speed of the moving web of sheet material and generating an electrical voltage proportional thereto and switch-operating relays controlled by the voltage generated by the speed-measuring means, said relays operating the switch in the circuit connecting the transformer to the electrodes and switches connecting the impedances of the second series of impedances in shunt with the electrodes, a series of current-limiting impedances, switches connecting said current-limiting impedances in circuit with the primary of the transformer, a series of relays for operating said switches, said relays being connected to a source of electrical energy and being operable at different voltages, respectively, means for measuring the porosity of the sheet material following perforations thereof and transducing the measured porosity into an electrical signal, means for comparing said electrical signal with a standard electrical signal corresponding to a selected porosity, means responsive to the difference in voltage between the measured signal and the standard signal for varying the voltage supplied to the switch-operating relays and an alarm circuit operable by said voltage-responsive means, said alarm circuit being operated upon the voltage of the voltage-responsive means exceeding one limit thereof.

16. The method of perforating dielectric sheet material by means of electrical discharges wherein a moving web of the sheet material passes between opposing spaced electrodes and pulses of electrical current are periodically discharged between the electrodes and through the moving sheet material, which includes the steps of measuring the speed at which a web of dielectric sheet material is moved between opposing electrodes, generating a voltage directly proportional to the measured speed of the sheet material, varying the capacity of a capacitive impedance connected in shunt with the opposing electrodes inversely in relation to changes in the generated voltage, measuring the porosity of the moving sheet material after the sheet has passed between the electrodes and has been perforated by electrical discharges between said electrodes and comparing the measured porosity with a selected porosity, then varying the impedance of a current-limiting impedance connected in series with the electrodes and a source of electrical energy when a difference exists between the measured porosity and the selected porosity, said current-limiting impedance being increased when the measured porosity exceeds the selected porosity and being decreased when the measured porosity is less than the selected porosity.

17. The method of perforating dielectric sheet material by means of electrical discharges wherein a moving web of the sheet material passes between opposing spaced electrodes and pulses of electrical current are periodically discharged between the electrodes and through the moving sheet material which includes the steps of measuring the speed at which a web of dielectric sheet material is moved between opposing electrodes, regulating the frequency of electrical discharges between the electrodes and through the sheet material in accordance with changes in the speed of the material by varying the capacity of a capacitive impedance connected in shunt with the opposing electrodes upon changes in the speed of the sheet material, said capacity being varied inversely in relation to the speed of the sheet material, measuring the porosity of the moving sheet material after said material has passed between the electrodes and has been perforated by the electrical discharges between the electrodes, comparing the measured porosity with a selected porosity and then regulating the thermal energy of said electrical discharges when a difference exists between the measured porosity and the selected porosity by varying the impedance of a current-limiting impedance connected in series with the electrodes and a source of electrical energy, said current-limiting impedance being increased when the measured porosity exceeds the selected porosity and being decreased when the measured porosity is less than the selected porosity.

18. The method of perforating dielectric sheet material by means of electrical discharges wherein a moving web of the sheet material is passed between opposing spaced electrodes and pulses of electric current are periodically discharged between the electrodes and the moving sheet material, which includes the steps of measuring the speed at which a moving web of sheet material passes between opposing spaced electrodes, generating a voltage directly proportional to the measured speed of the moving sheet material and regulating the frequency of the discharges in accordance with changes in the speed of the sheet material by varying the capacity of a capacitive-impedance connected in shunt with the electrodes, said capacity being varied inversely in relation to changes in the generated voltage.

19. The method of perforating dielectric sheet material by means of electrical discharges wherein a moving web of the sheet material passes between opposing spaced electrodes and pulses of electrical current are periodically discharged between the electrodes and through the moving sheet material, which includes the steps of measuring the porosity of a moving sheet of dielectric material after said sheet has passed between opposing spaced electrodes and has been perforated by passing electrical discharges between the electrodes and through the sheet material, comparing said measured porosity with a selected porosity and then regulating the thermal energy of said electrical discharges when a difference exists between the measured porosity and a selected porosity, the thermal energy of the discharges being regulated by changing the value of a current-limiting impedance in a circuit connecting the electrodes to a source of electrical energy.

20. The method of perforating dielectric sheet material by means of electrical discharges wherein a moving web of the sheet material passes between opposing spaced electrodes and pulses of electrical current are periodically discharged between the electrodes and through the moving sheet material as defined in claim 19 wherein the current-limiting impedance connected in series with the electrodes and a source of electrical energy comprises a condenser and the thermal energy of the electrical discharges is regulated by decreasing the capacity of said condenser when the measured porosity exceeds the selected porosity and by increasing the capacity of said condenser when the measured porosity is less than the selected porosity.

21. In an apparatus for perforating dielectric sheet material by means of electrical discharges wherein a web of the sheet material is moved between opposing sets of spaced electrodes and pulses of electrical current are discharged between the opposing electrodes and through the moving sheet material, the combination which includes a transformer having a primary and a secondary with the primary being connected to a source of alternating current, a circuit connecting a set of opposing spaced electrodes to the secondary of the transformer, said circuit including a rectifier connected in series with the secondary of the transformer and the electrodes, a pulse-forming network connecting the rectifier to the electrodes, said network producing periodic discharges of current between said electrodes and through a sheet of dielectric material moving between the opposing electrodes and including impedances connected in series and in parallel with the electrodes, said parallel impedance including a variable capacitive impedance for controlling the frequency and duration of said discharges and means independent of the pulse-forming network for controlling the thermal energy of the discharges between the electrodes, said last mentioned means including a variable impedance connected in circuit with the transformer.

22. In an apparatus for perforating dielectric sheet material by means of electrical discharges wherein a web of the sheet material is moved between opposing sets of spaced electrodes and pulses of electrical current are discharged between the opposing electrodes and through the moving sheet material, the combination which includes a transformer having a primary and a secondary with the primary being connected to a source of alternating current, a circuit connecting a set of opposing spaced electrodes to the secondary of the transformer, said circuit including a rectifier connected in series with the secondary of the transformer and the electrodes, a pulse-forming network connecting the rectifier to the electrodes, said network being capable of producing periodic discharges of current between said electrodes and through a sheet of dielectric material moving between the opposing electrodes and including impedances connected in series and in parallel with the electrodes, said parallel impedance comprising a series of capacitances of different capacities and switching means for connecting said capacitances in circuit with the electrodes and means independent of the pulse-forming network for controlling the thermal energy of the discharges between the electrodes, said last mentioned means including a variable capacitance connected in circuit with the transformer.

23. In an apparatus for perforating dielectric sheet material by means of electrical discharges wherein a web of the sheet material is moved between a set of opposing spaced electrodes and pulses of electrical current are discharged between the electrodes and through the moving sheet material, the combination which includes a transformer having a primary and a secondary with the primary being connected to a source of alternating current, a circuit connecting a set of opposing spaced electrodes to the secondary of the transformer, said circuit including a rectifier connected in series with the secondary of the transformer and the electrodes, a pulse-forming network connecting the rectifier to the spaced electrodes, said network being capable of causing periodic discharges of current between said electrodes and through a sheet of dielectric material moving between the opposing electrodes and including impedances connected in series and in parallel with the electrodes, said parallel impedance including a variable capacitive impedance for controlling the frequency and duration of said discharges, means for automatically varying the capacity of the capacitive impedance inversely with respect to variations in the speed at which the material moves between the electrodes and thereby maintaining the frequency of the discharges per unit of length of the material within predetermined limits and means independent of the pulse-forming network for controlling the thermal energy of the discharges between the electrodes, said last mentioned means including a variable impedance connected in circuit with the transformer.

24. An apparatus for perforating dielectric sheet material by means of electrical discharges wherein a transformer has a primary connected to a source of electrical energy and a secondary connected to a set of opposing electrodes, said opposing electrodes being spaced by a discharge gap and the sheet of dielectric material is moved through the gap between the opposing electrodes that is characterized by a pulse-forming network connected in circuit with the secondary of the transformer and the electrodes, said network including a capacitive impedance connected in shunt with the electrodes, the capacity of said impedance being variable for controlling the frequency of electrical discharges between the electrodes and through the moving sheet of material voltage generating means driven by movement of the sheet material and means operable by said voltage generating means for varying the capacity of said impedance inversely with respect to the speed at which the sheet material is moved through the gap between the electrodes.

25. An apparatus for perforating dielectric sheet material by means of electrical discharges wherein a transformer has a primary connected to a source of electrical energy and a secondary connected to a set of opposing electrodes, said opposing electrodes being spaced by a discharge gap with the sheet of dielectric material being moved through said gap and between the opposing electrodes that is characterized by a pulse-forming network connected in circuit with the secondary of a transformer and a set of opposing spaced electrodes, said network including an impedance of variable capacity connected in shunt with the electrodes and means for varying the capacity of said impedance inversely with respect to the speed at which a sheet of material is moved between the opposing electrodes, said means including switches in circuit with the impedance and the electrodes, a generator driven by the movement of the sheet material, and switch operating relays connected to the output of the generator and controlling the operation of said switches.

26. An apparatus for perforating dielectric sheet material by means of electrical discharges wherein a transformer has a primary connected to a source of electrical energy and a secondary connected to a set of opposing electrodes, said opposing electrodes being spaced by a discharge gap with the sheet of dielectric material being moved through the gap and between the opposing electrodes that is characterized by a pulse-forming network connected in circuit with the secondary of a transformer and a set of opposing spaced electrodes, said network including an impedance of variable capacity connected in shunt with the electrodes for controlling the frequency of electrical discharges between the electrodes and through the moving sheet of material voltage generating means driven by movement of the sheet material between the electrodes, means operable by said voltage generating means for closing the circuit connecting the transformer to the electrodes and for varying the capacity of said impedance inversely with respect to the speed at which the sheet material is moved through the gap between the electrodes, said last-mentioned means including a switch connecting the secondary of the transformer to the electrodes, said switch being normally open and being closed when the sheet material reaches a predetermined speed.

References Cited in the file of this patent

UNITED STATES PATENTS

| Number | Name | Date |
| --- | --- | --- |
| 1,930,127 | Klinkhamer | Oct. 10, 1933 |
| 2,113,714 | Stein | Apr. 12, 1938 |
| 2,141,869 | Konig | Dec. 27, 1938 |
| 2,205,255 | Gulliksen | June 18, 1940 |
| 2,385,246 | Wilsey et al. | Sept. 18, 1945 |
| 2,389,049 | Hines | Nov. 13, 1945 |
| 2,528,157 | Menke | Oct. 31, 1950 |
| 2,528,158 | Menke | Oct. 31, 1950 |
| 2,549,966 | Grouse | Apr. 24, 1951 |
| 2,553,203 | Monty | May 15, 1951 |
| 2,603,737 | Erdman, Jr. | July 15, 1952 |